July 2, 1963

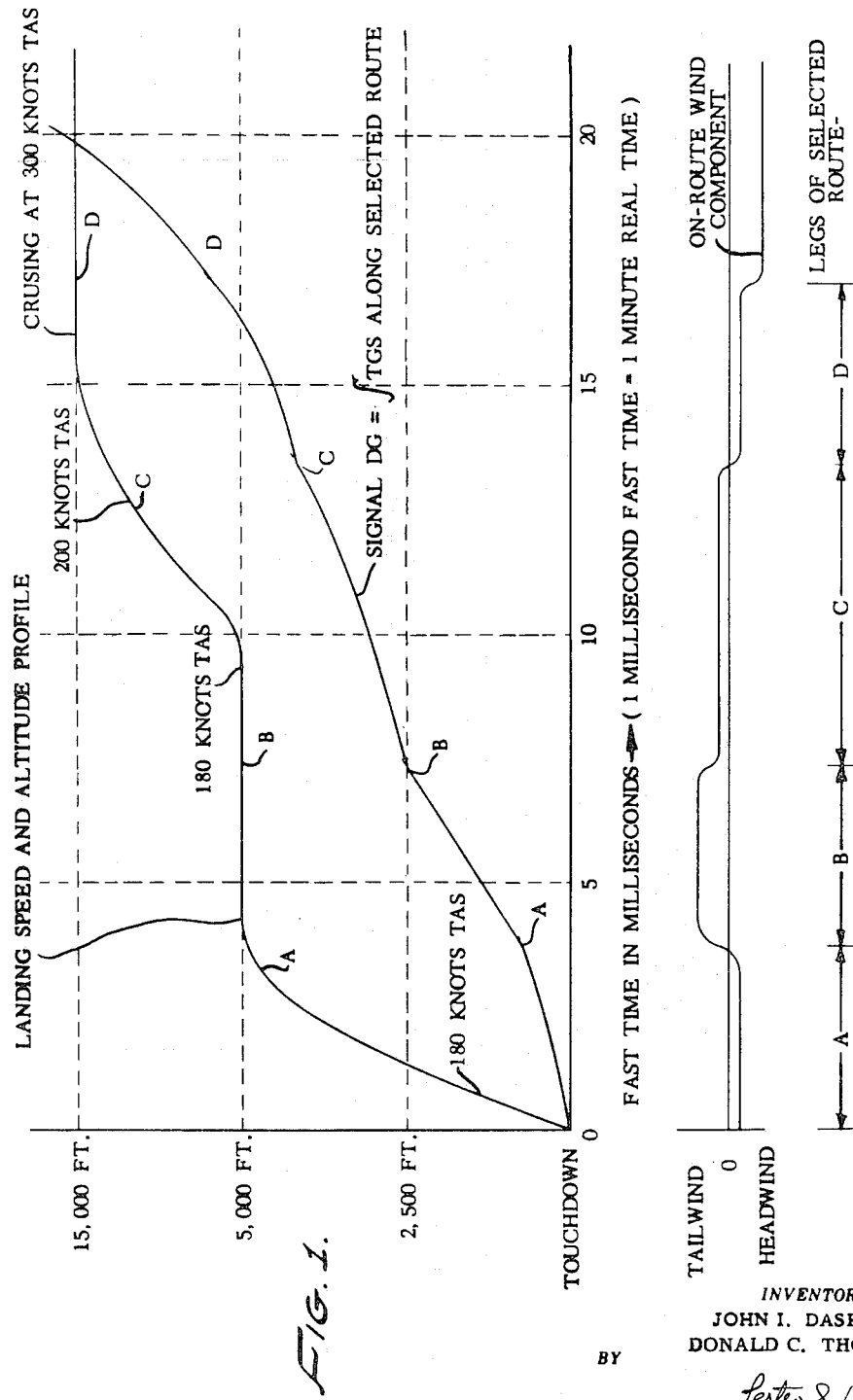

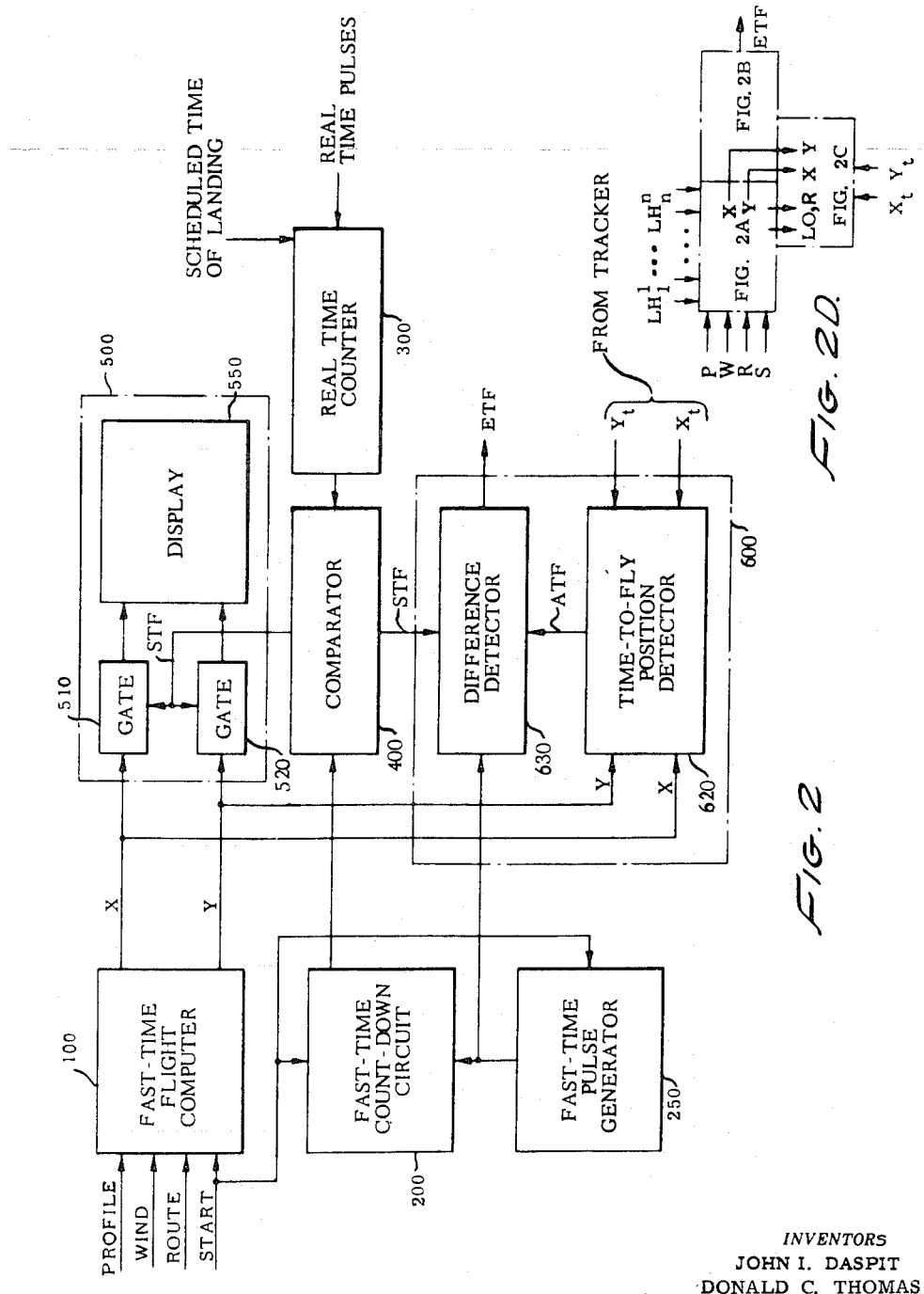

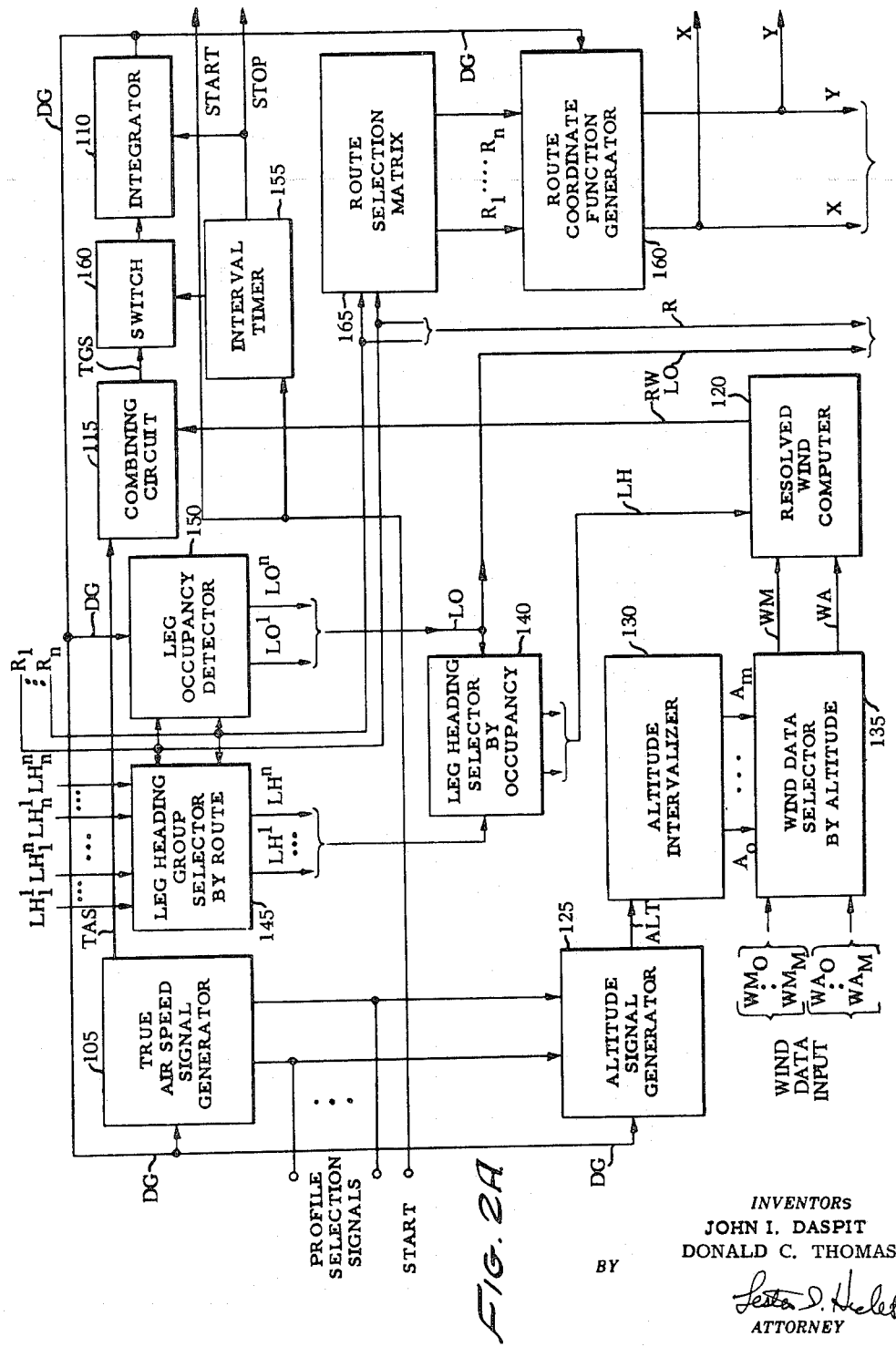

J. I. DASPIT ET AL 3,096,433

AIR TRAFFIC CONTROL SYSTEM

Filed July 3, 1959

INVENTORS
JOHN I. DASPIT
DONALD C. THOMAS

BY

ATTORNEY

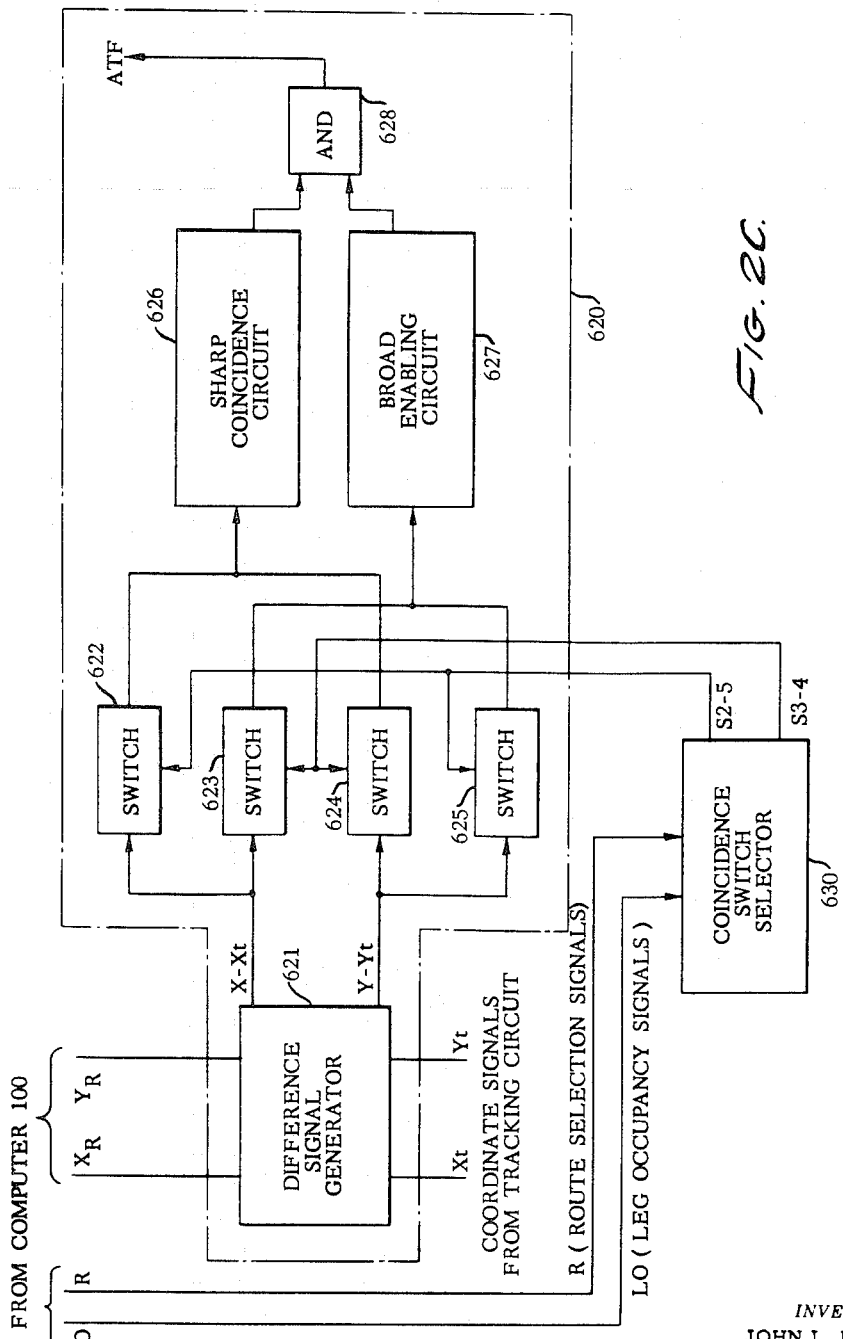

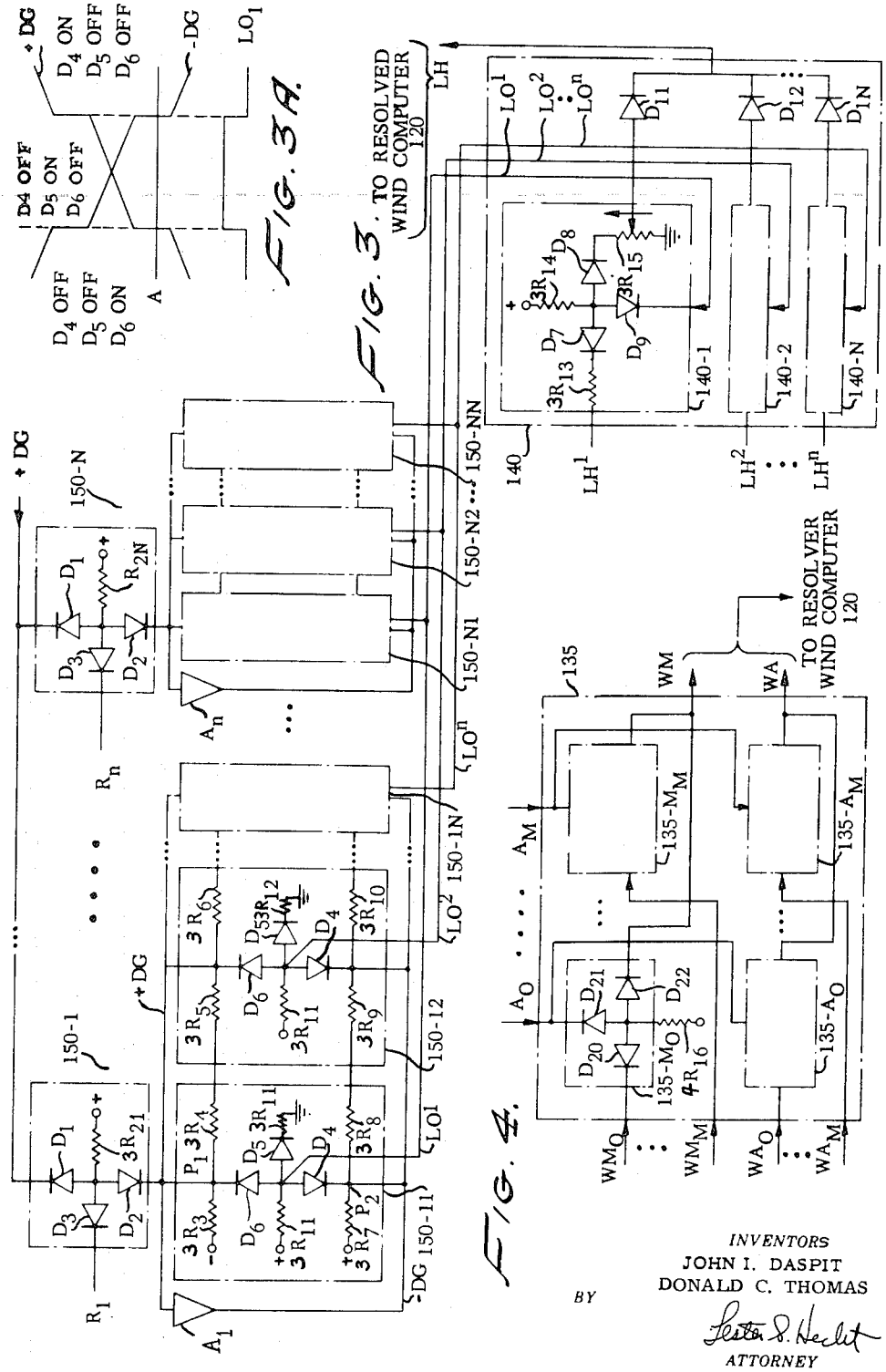

July 2, 1963
J. I. DASPIT ET AL
3,096,433
AIR TRAFFIC CONTROL SYSTEM
Filed July 3, 1959
8 Sheets-Sheet 7
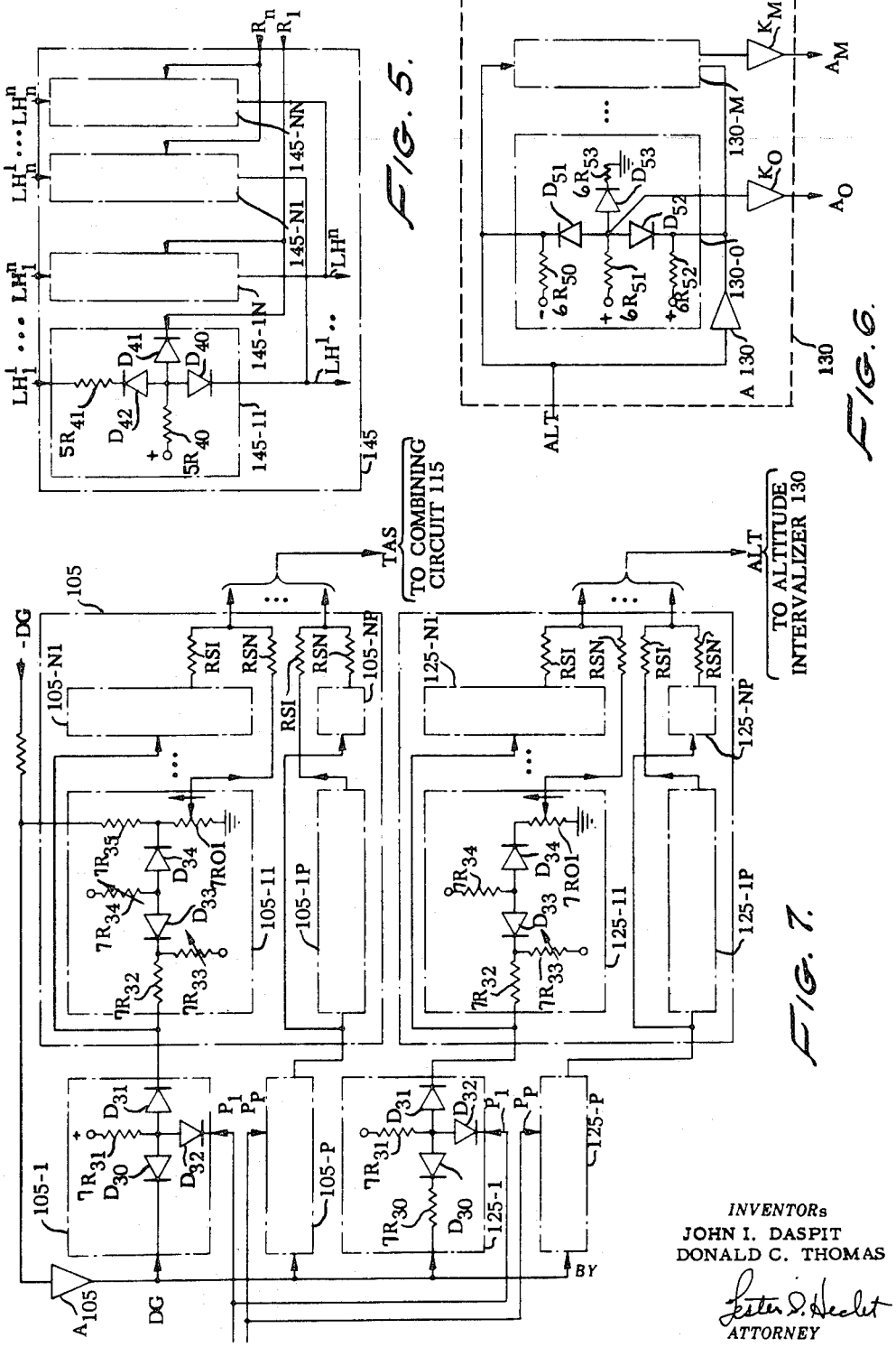
INVENTORs
JOHN I. DASPIT
DONALD C. THOMAS
*Lester D. Hecht*
ATTORNEY

*INVENTORS*
JOHN I. DASPIT
DONALD C. THOMAS

BY

*ATTORNEY*

United States Patent Office 3,096,433
Patented July 2, 1963

3,096,433
AIR TRAFFIC CONTROL SYSTEM
John I. Daspit and Donald C. Thomas, Los Angeles County, Calif., assignors to Tasker Instruments Corporation, Van Nuys, Calif., a corporation of California
Filed July 3, 1959, Ser. No. 824,843
9 Claims. (Cl. 235—151)

This invention relates to air traffic control apparatus and, more particularly, to a system, and subcomponent circuits thereof for producing output signals representing the scheduled position of a selected one of a plurality of aircraft, and/or for producing a schedule error signal indicating the lead or lag of the aircraft with respect to its time schedule.

The present invention is, in part, an improvement over the system described and claimed in copending U.S. patent application for "Method and Apparatus for Air Traffic Control," Serial No. 747,631, filed July 10, 1958, by Homer G. Tasker, now Patent No. 3,063,634. In this copending application a new approach to the fixed route air traffic control problem is introduced whereby the error in the time schedule for each of a plurality of aircraft may be computed at high speed by means of simple electronic computing circuits.

According to the basic concept of the copending application the schedule error is determined by comparing a computed remaining actual time of flight signal with a signal indicating the remaining scheduled time of flight.

The present invention provides an improved technique for computing the schedule error and, in addition, makes it possible to utilize the same circuits to produce signals representing the scheduled position of a selected aircraft. The expression "scheduled position" will be employed hereinafter to signify the position which the selected aircraft would occupy if it were on its schedule and on its flight path.

According to the basic concept of the present invention a simulated flight is made along the aircraft's scheduled route each time a scheduled position is to be determined. The simulated flight is made in a computing system which takes into account the aircraft's scheduled altitudes, headings, and airspeeds; and the wind magnitude and direction at all points in the aircraft's scheduled route. The simulated flight is made in fast time, and the position of the simulated aircraft along the simulated route after a given interval of fast time gives an accurate index to the scheduled position of the real aircraft along the real route for an equivalent interval of real time. For example, suppose one minute of real time equals one millisecond of fast time. Then to find the scheduled position of a real aircraft at five minutes before its scheduled touchdown time, the simulated aircraft can be flown backwards along the simulated route, and the position of the simulated aircraft after five milliseconds of fast time along the simulated route gives the scheduled position of the real aircraft along the real route.

According to a preferred embodiment of the invention, the position of the simulated aircraft is represented by the magnitude of a flight signal which is varied, during the simulated flight, at a rate controlled in accordance with the true ground speed of the aircraft at different points along the simulated route. True ground speed is derived from the real aircraft's scheduled heading, altitude, and airspeed; along with the actual wind conditions along the real route. Thus if a strong head wind prevails in any leg of the real route, a head wind signal is introduced into the corresponding leg of the simulated route, and the simulated flight therefore compensates for the effect of the head wind in arriving at a scheduled position.

Since the simulated flights are made in fast time in electronic computing circuits, the invention can be used to provide frequent schedule positions for a plurality of aircraft each at different points along different routes to a common destination, as, for example, a large airfield. And since the computing circuits take into account actual wind conditions on the various routes, the schedule positions derived therefrom give the aircraft pilots an accurate guide for controlling their aircrafts to arrive precisely at the scheduled time, thereby eliminating the air traffic congestion due to aircraft arriving earlier or later than their scheduled time of arrival.

In one embodiment of the invention a flight signal DG is produced during simulated flight to continuously represent the distance remaining for the aircraft to travel along its flight path to reach a predetermined point on the path, such as touchdown, at a scheduled time. The flight signal DG is generated as the integral of the true ground speed of the aircraft, which is represented by a signal TGS which is developed by combining a true air speed signal TAS with a signal representing wind velocity resolved along the route of the aircraft. In one specific form of the invention signal TAS is produced by selecting among a plurality of signal generators responsive to signal DG in accordance with the "profile" of the selected aircraft, the term "profile" being employed to designate the true air speed and altitude variations which are scheduled for the aircraft along its flight path. Each signal generator is mechanized to receive signal DG and to produce a time-varying output signal TAS which has an amplitude at each point of fast time corresponding to the air speed which is specified for the particular aircraft by its profile. According to the invention, therefore, the signal generators may be actuated by profile selection signals $P_1 \ldots P_p$ (where $p$ indicates any desired number of profiles) to generate the desired fast time-varying signal TAS.

In a similar manner, a resolved wind signal RW may be developed having an amplitude which varies in fast time to represent the wind velocity along the route of the selected aircraft for each point of fast time. In the particular embodiment of the invention disclosed this signal is developed by first translating flight signal DG into altitude interval signals $A_o \ldots A_m$ according to the profile of the selected aircraft, and then selecting corresponding stored signals $WMo \ldots WMm$ and $WAo \ldots WAm$; representing the wind magnitude and WA the wind angle at the respective altitudes. Signal RW is then developed by performing a trigonometric function upon the selected wind signals and a signal LH representing the heading of the leg presently occupied, in fast time, along the aircraft route.

According to one method of utilizing embodiments of the invention flight signal DG is translated into output signals representing the scheduled coordinates for the aircraft at the corresponding value of real time. In particular, this may be accomplished in the case where the simulated flight signal represents reverse flight in fast time by counting fast time unit pulses until the count equals the scheduled time remaining for flight, and then utilizing the detection of equality to produce a selection pulse STF which is employed to read out signals X and Y as a function of signal DG resolved for the particular aircraft route. A similar technique may be employed, of course, where the flight is simulated in the forward direction in fast time. In this case the schedule time number is effectively represented as the complement of the schedule time remaining with reference to a particular flight starting point. This possibility is discussed further below.

Signals X and Y produced in the above manner may then be employed to represent the scheduled position of the aircraft as a simulated radar spot on a cathode ray tube display so that the operator may conveniently note the approximate error in position.

In another mode of operating circuits of the invention, signals X and Y are compared to actual aircraft position signals, which may suitably be obtained from a tracker circuit, in order to determine when the simulated flight signals are within predetermined limits of the actual position signals representing the aircraft. When an approximate coincidence is detected between the simulated flight signals X and Y and the tracker signals, referred to as $Xt$ and $Yt$, a signal is produced which may be referred to as the actual flight time remaining signals ATF. That is, coincidence indicates a simulated time interval corresponding to the actual time which would remain for the aircraft if it were precisely on its prescribed flight path. The scheduled time remaining signal STF (which may be a pulse) mentioned above, is then compared in time or amplitude to signal ATF to develop an error signal ETF representing the difference therebetween, and thus the lead or lag in the flight schedule.

Accordingly, it is an object of the present invention to provide an improved system and appropriate subcomponent circuits for producing signals indicating the scheduled error in flight for a selected aircraft.

Another object of the invention is to provide a system which is selectively operable to produce signals representing the scheduled position for an aircraft taking into consideration information relating to the aircraft's profile, route, and the effect of wind along the aircraft's flight path.

A further object of the invention is to provide a device for simulating the scheduled flight of an aircraft along a predetermined route at predetermined air speeds along the route and with predetermined altitude variations according to a prespecified profile.

Still another object of the invention is to provide a fast-time flight computer for producing output signals X and Y continuously representing the proper coordinate position for an aircraft throughout a simulated flight in fast time.

Yet another object of the invention is to provide improved circuits for generating signals which may be combined to represent such variables as true air speed, altitude, wind magnitude and velocity, generated to correspond to various points of a predetermined flight path for an aircraft scheduled to fly along a fixed route, such as a civil airway.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

FIG. 1 is a complete chart illustrating the variation in magnitude of flight signal DG with respect to aircraft profile, wind conditions, and route for a simulated flight in fast time in one embodiment of the invention;

FIG. 2 is a block diagram illustrating the general form of one system embodying the invention;

FIG. 2A shows a suitable arrangement for computer 100 of FIG. 2;

FIG. 2C shows a suitable arrangement for time-to-fly position detector 620 of FIG. 2 and indicates the manner in which this component is interconnected with others in the system;

FIG. 2D is a diagram illustrating the manner in which FIGS. 2A, 2B, and 2C are combined to form a complete block diagram of one suitable form for the system of FIG. 2;

FIG. 3 is a schematic diagram of a suitable arrangement for generators 140 and 150 of FIG. 2A;

FIG. 3A is a waveform chart illustrating the operation of circuits disclosed in FIG. 3;

FIG. 4 shows a schematic diagram for wind data selector 135 of FIG. 2A;

FIG. 5 illustrates a suitable circuit for leg heading selector 145 of FIG. 2A;

FIG. 6 is a schematic diagram of one form of circuit for altitude intervalizer 130 of FIG. 2A;

FIG. 7 illustrates a suitable arrangement for true airspeed signal generator 105 of FIG. 2A and altitude signal generator 125 of FIG. 2A;

Figure 8:
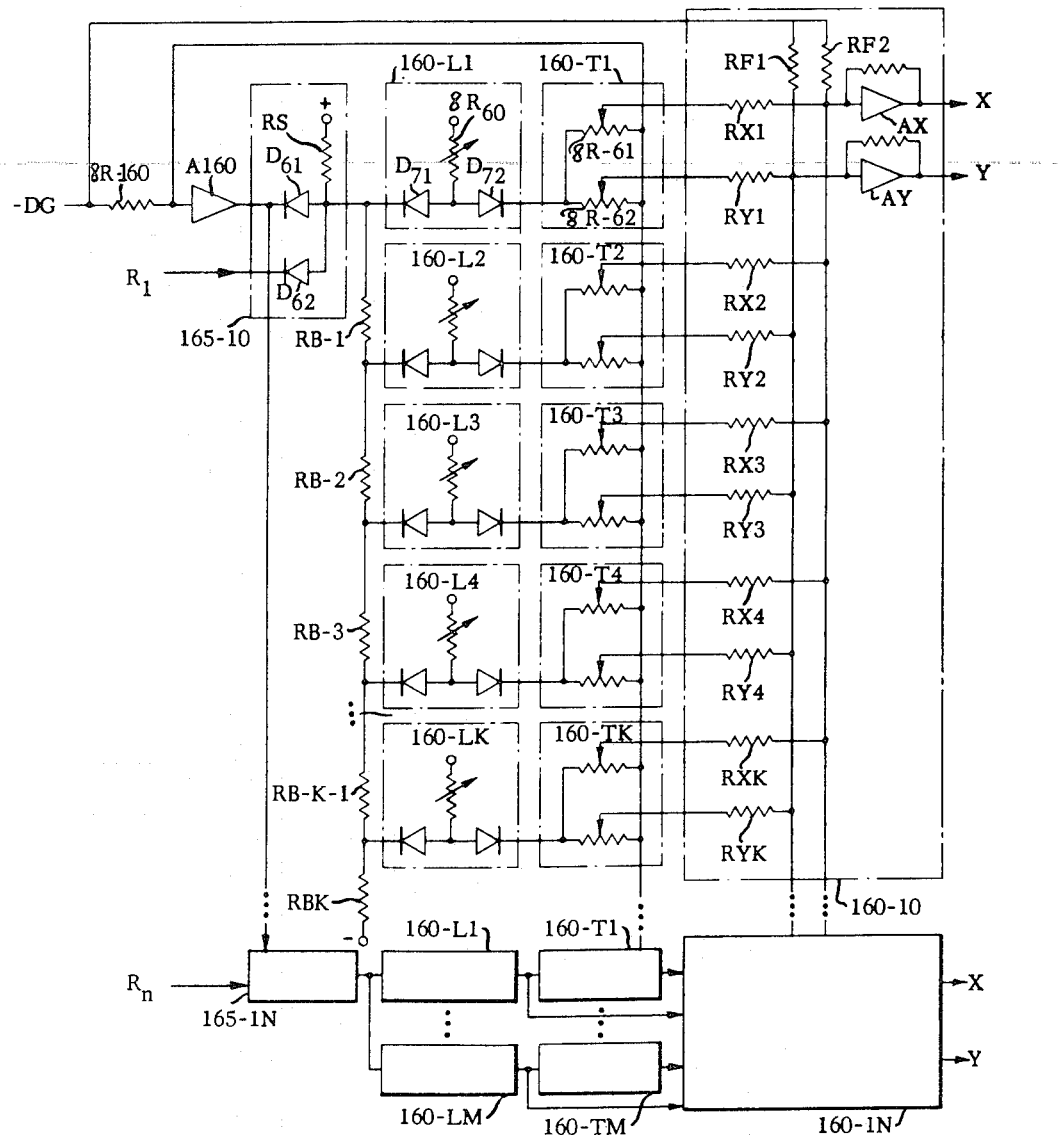
Figure 8A:
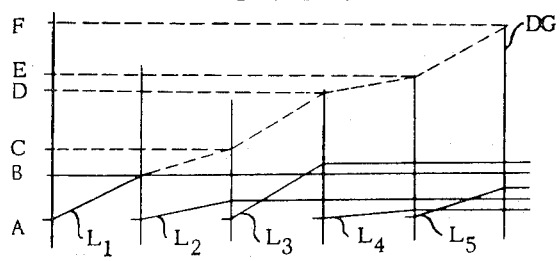

FIG. 8 is a schematic diagram of a suitable circuit for generator 160 and matrix 165 of FIG. 2A; and FIG. 8A is a composite set of various waveforms illustrating the operation of the circuit of generator 160 disclosed in FIG. 8.

FIG. 1 illustrates the general relation of flight signals DG with aircraft profile, wind conditions, and route during a simulated flight in fast time in one embodiment of the invention. In this embodiment, the magnitude of flight signal DG represents the distance remaining for the aircraft to travel along the scheduled flight path to arrive at a predetermined point, in this case touchdown, precisely at the scheduled time. The aircraft profile curve shows the scheduled altitudes and true air speeds (TAS) for a specific aircraft making a land approach along a specific route. The profile is generally different for each different type of aircraft, but it is known in advance to both the pilot and the air traffic control system. The approach route is also known in advance to both the pilot and the air traffic control system. In this example the route is shown having four legs; A, B, C, and D. The aircraft enters leg D at 15,000 ft. cruising at 300 knots TAS. After turning onto leg D, the aircraft begins losing speed and altitude, as shown in the profile. After turning onto leg C, the aircraft loses altitude more rapidly, and continues to lose speed until reaching the required landing speed, in this example 180 knots TAS. In leg B the aircraft maintains constant altitude and speed, and after turning onto leg A, the final approach, the aircraft descends rapidly and uniformly to touchdown.

The on-route wind component curve shows the effective magnitude and direction of the wind at the corresponding points on the route at the altitudes specified in the profile. The wind component is derived by measuring the wind direction and magnitude at the appropriate altitudes, and trigonometrically resolving the wind vector to determine the component thereof parallel with the aircraft flight path on the corresponding leg of the scheduled route. The aircraft's true ground speed (TGS) can then be determined by algebraically adding the on-route wind component to the true air speed.

To illustrate the generation of signal DG in this embodiment of the invention, assume that a real aircraft having the profile shown is cruising beyond leg D with approximately 20 minutes remaining to its scheduled touchdown time. Assume that the actual position of the aircraft on its flight path is known, by tracking radar or other means, and that it is desired to determine whether or not the aircraft is on schedule, and if not the exact amount of lead or lag. To obtain this information a simulated flight is made, in fast time, in the electronic circuitry of the invention to obtain flight signal DG, whose magnitude at any value in fast time indicates the corresponding position of the real aircraft on the real route for the equivalent value of real time. Since the real aircraft is 20 minutes in time from touchdown, the magnitude of DG at 20 milliseconds in fast time will provide the desired schedule position.

The simulated flight in this example is made backward, starting from touchdown and proceeding in reverse along the specified route and profile. The amplitude of DG increases, in fast time, as the integral of true ground speed (TGS) which is the algebraic sum of scheduled TAS and on-route wind component. Tracing the magnitude of DG from touchdown, it will be seen that DG increases linearly in leg A, since TAS remains constant and the on-route wind component remains constant in this leg. But turning onto leg B, the on-route wind component changes from a small head wind to an appreciable tail wind, therefore increasing the TGS, and consequently the rate of increase in DG. In leg C the tail wind is reduced, and the growth of DG is correspondingly reduced in the first portion of the leg. But in the middle of leg C the profile, in reverse, indicates an increase in airspeed from 180 knots to 200 knots, so the growth of DG increases slightly at the end of leg C. In leg D the moderate tail wind changes to a moderate head wind, which reduces the growth of DG, but the reduction is soon overcome by an increase in TAS from 200 knots to 300 knots. In turning out of leg D, the head wind increases, reducing the rate of increase in DG by a corresponding amount. At the end of 20 milliseconds in fast time, the instantaneous magnitude of DG is recorded to give the scheduled distance remaining for the aircraft at touchdown minus 20 minutes in real time. Since the aircraft is traveling along a predetermined route, the magnitude of DG can be easily translated into a specific point on the route, which represents the point where the aircraft should be at touchdown minus 20 minutes to arrive exactly on schedule. The scheduled location can then be compared, either manually or automatically, to the actual location to determine the amount of lead or lag, which can then be relayed to the pilot, either manually or automatically. From this information the pilot can determine the exact amount of correction required to get on schedule.

Since the operation described above is performed in a matter of milliseconds, the invention is easily adaptable to situations involving a plurality of aircraft at different times from scheduled touchdown on different routes. By generating profile signals corresponding to each aircraft and route signals corresponding to each route, the same basic equipment can be utilized to provide frequent scheduled positions for a large number of aircraft to precisely control their time of arrival, and thus eliminate air traffic congestion. There are many ways of mechanizing the invention to attain these desirable objectives, one of which is illustrated in FIGS. 2 through 8, and described in detail below.

Reference is now made to FIG. 2 wherein the invention is illustrated in block diagram form. The system of the invention is shown to include a fast time flight computer 100 which receives signals indicating the profile of an aircraft, or aircrafts, to be controlled, the wind at various altitudes, the routes for an aircraft, or aircrafts, to be controlled, and a start signal. Fast time flight computer 100 produces fast time-varying output signals X and Y which may represent (in one embodiment of the invention) the coordinate position of an aircraft in reverse flight from touchdown along a predetermined route for the aircraft. The coordinate position of the aircraft is varied in simulated flight while taking into account wind conditions at various altitudes and the profile of the aircraft. In addition, computer 100 also produces leg-occupancy signals, referred to herein as signals LO, indicating which leg of the aircraft route is occupied at any time during the simulated flight. The leg occupancy signals are utilized to select the appropriate profile, wind, and route signals during the course of the simulated flight to give an accurate representation of actual flight conditions along the real scheduled route.

The fast time flight computation is initiated in response to a start signal which is also effective to cause the counting down operation of a fast time countdown circuit 200 in response to pulses produced by a fast time pulse generator 250. The output signal of countdown circuit 200 is compared in a comparator 400 to the real time remaining to scheduled time of landing, which is generated in real time counter 300. Real time counter 300 receives a signal designating the specified time of landing, which is continuously compared with real time pulses to give the interval of time remaining to scheduled touchdown for the aircraft in question.

Comparator 400 produces an output signal STF when the count of circuit 200, in fast time, is equal to the count of circuit 300, in real time. In this manner comparator 400 produces an output pulse STF which is spaced in fast time from the start signal by an amount corresponding to the scheduled real time remaining for the particular aircraft to land.

Comparator 400 is coupled to output circuit 500, which receives signals X and Y and provides an appropriate display of the instantaneous values thereof when signal STF is received from comparator 400, indicating the end of the scheduled time interval measured, for example, in reverse time from touchdown. Signals X and Y are generated to represent the scheduled position in reverse flight from touchdown at the corresponding count in fast time from the start signal. Therefore signals X and Y will represent the scheduled position of the aircraft at any moment in real time to place the aircraft at touchdown precisely at the scheduled time of landing.

As indicated in FIG. 2, circuit 500 may include gates 510 and 520 receiving signals X and Y, respectively, and a suitable display device 550 which typically may comprise a cathode ray tube. A spot may thus be presented on a cathode ray tube representing the scheduled aircraft position if the deflection circuits of the tube are controlled in corresponding simulated fast time by signals X and Y. Thus, the position of the spot on the cathode ray tube may simulate the radar echo of an aircraft which is on schedule.

The real radar signal information which is received respecting the same aircraft may, of course, be displayed on the same display 550 so that the operator may quantitatively determine the approximate error in the flight position thereof.

In the second mode of operation according to the invention a schedule time error signal ETF is generated by effectively computing the difference between the scheduled remaining time to fly signal STF and an actual remaining time to fly signal ATF. Signal STF may be generated as discussed above by comparing a fast time count with a real time remaining count, and by actuating a pulse circuit when the fast time count equals the real time remaining count. Signal ATF may be obtained by detecting the approximate coincidence between the fast time coordinate signals X and Y, produced in the manner indicated above, and actual aircraft coordinate signals $Xt$ and $Yt$, which may be obtained from a tracking circuit such as are now well known in the radar art. Arrangement 600, shown in FIG. 2 is thus mechanized to generate an actual time to fly signal ATF in a time to fly position detector 620, which compares the magnitude of signals X and Y with the magnitudes of signals $Xt$ and $Yt$, and produces an output pulse when approximate equality is determined therebetween. Signals ATF and STF are applied to difference detector 630, which counts, in fast time, the time interval between the two signals. The difference between the ATF and STF pulses, in fast time, provides an error-in-time of flight signal, ETF, which indicates the deviation in real time of the aircraft from its scheduled position. For example, if the STF signal precedes the ATF signal by five counts in fast time, the aircraft is approximately five minutes behind schedule. If the STF signal follows the ATF signal by five counts, the aircraft is five minutes ahead.

Figure 2B:
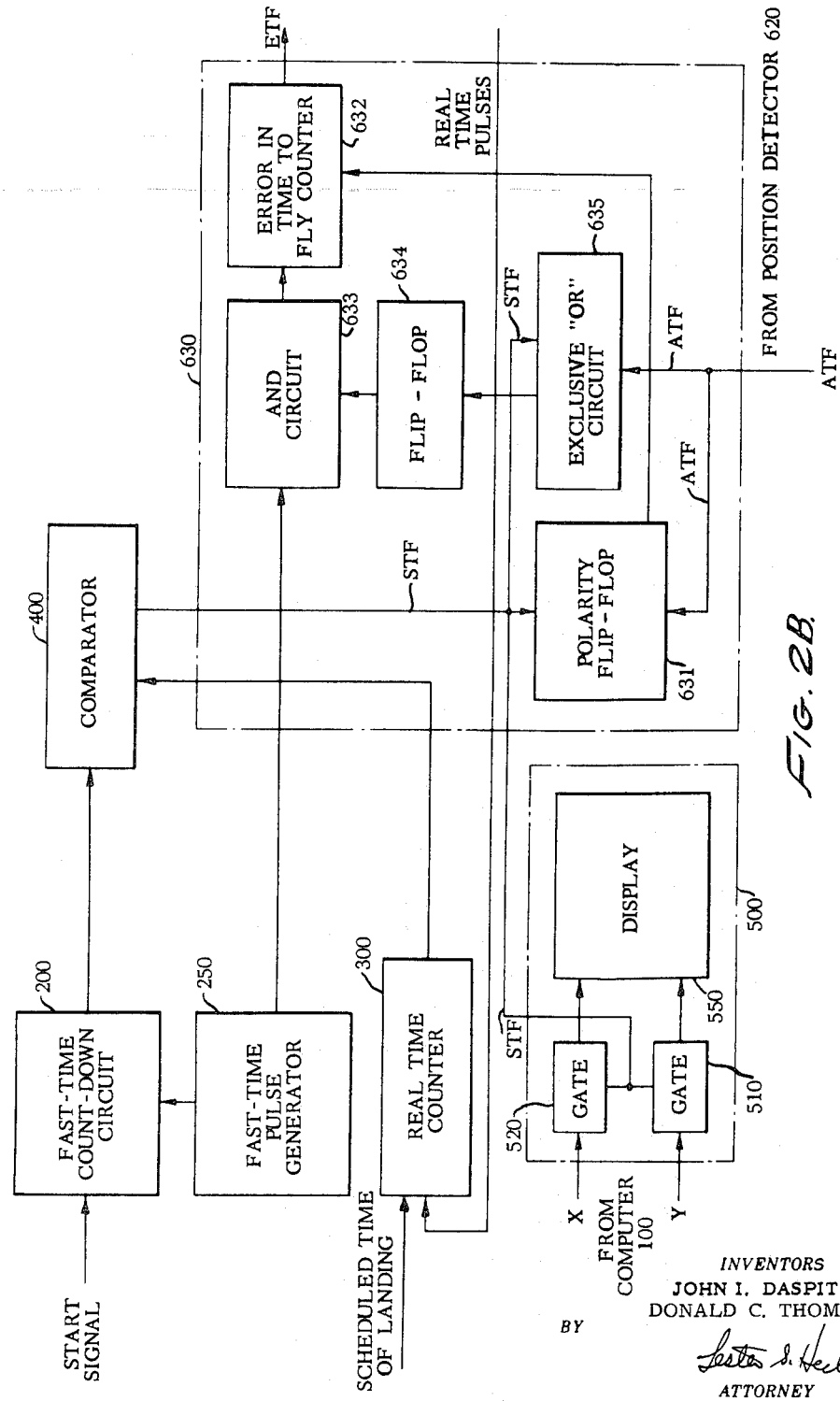
FIG. 2B shows a suitable arrangement for difference detector 630 of FIG. 2 and the manner in which this circuit is interconnected with other components of the system of FIG. 2.

A typical arrangement for the various components of the embodiment of FIG. 2 is illustrated in FIGS. 2A, 2B, and 2C. The general relationship between these figures is indicated in FIG. 2D, where the input and output signals of FIG. 2 are indicated as well as some of the connections between the components.

FIG. 2A illustrates a typical arrangement of fast time flight computer 100 of FIG. 1. In this arrangement a true air speed signal generator 105 receives the output signal DG of an integrator circuit 110 and produces an output signal TAS representing the true air speed of a selected aircraft. The control of TAS in accordance with the aircraft profile is made in response to profile selection signals applied to generator 105 as shown. Signal TAS is applied to a combining circuit 115, which also receives an output signal RW of a resolved wind computer 120. Signal RW represents the component of wind velocity resolved along the flight path of the selected aircraft for point along the flight path.

Signal RW is developed by first generating an altitude signal ALT through an altitude signal generator circuit 125, which receives signal DG produced by integrator 110 and produces an output signal which indicates the altitude variations for the selected aircraft, according to its profile, as it moves in simulated flight along its flight path, each value of signal DG being known to correspond to a particular altitude which is predesignated for the type of aircraft.

Signal ALT is translated into a series of altitude interval signals $A_O \ldots A_m$ corresponding to the various altitudes for the profile of all types of aircraft. This is accomplished through altitude intervalizer 130.

Signals $A_O \ldots A_m$ are applied to a wind data selector circuit 135 which receives input data signals representing the wind magnitude (WM) and wind angle (WA) for the various altitudes represented by signals $A_O \ldots A_m$. It will be noted that the subscripts for signals WM and WA correspond to those of signals $A_O \ldots A_m$, respectively.

Selector circuit 135 acts to produce an output signal WM and an output signal WA for each altitude, these signals being applied to resolved wind computer 120 to indicate wind magnitude and direction on the leg occupied, in fast time, during the simulated flight. Resolved wind computer 120 also receives a leg heading signal LH produced by a leg heading selector circuit 140, which has a value representing the heading of the particular leg on the route corresponding to the present position of the aircraft in simulated flight. This signal varies in simulated time to continuously represent the scheduled leg heading for the selected aircraft during its simulated flight. The leg heading signal LH is trigonometrically resolved in wind computer 120 to provide the output signal RW, which indicates the magnitude and direction (head wind or tail wind) of the on-route wind component at each point in the simulated flight. Signal RW is fed from resolved wind computer 120 to combining circuit 115, where it is algebraically added to the TAS signal to produce a true ground speed signal TGS. A signal DG, representing distance to go to touchdown, is derived by integrating TGS during the simulated flight in an integrator 110. A switch 160, interposed between integrator 110 and combining circuit 115, controls the integration. Switch 160 is opened by the start signal, which initiates the simulated flight, and closed by a stop signal from interval timer 155, which ends the simulated flight and returns the signal level in integrator 110 back to zero. Thus signal DG increases from zero at the start signal, growing in magnitude as the integral of true ground speed during the simulated flight. Signal DG is utilized to generate space coordinate X and Y, which represent the location of the simulated aircraft during simulated flight, as will be described in later paragraphs. Signal DG is also fed back to TAS generator 105, altitude signal generator 125, and leg occupancy detector 150 to control selection of profile, wind, and route signals during the simulated flight.

Referring again to leg heading selector 140, the leg heading signal LH, previously described in connection with signal RW, is produced by selecting the appropriate signal from a group of leg heading signals $LH^1 \ldots LH^n$, which represent the heading of the individual legs in a predetermined route. Selection is made by leg occupancy signals $LO^1 \ldots LO^n$, which are produced by leg occupancy detector 150. The leg occupancy signals $LO^1 \ldots LO^n$ are switched on in time sequence in accordance with signal DG during the simulated flight to indicate which leg of the route is presently occupied by the simulated aircraft. When signal $LO^1$ is on, the aircraft is in the first leg of the simulated flight, and the leg heading signal $LH^1$ is selected in selector 140. When the aircraft enters the second leg of the simulated flight, $LO^1$ is turned off and $LO^2$ is turned on, which selects leg heading signal $LH^2$ in selector 140. Selected in sequence, the leg heading signals $LH^1 \ldots LH^n$ represent the route of the simulated flight, and it will be understood that signals $LH^1 \ldots LH^n$ are predetermined to represent leg headings of a real route flown by a real aircraft.

A plurality of leg heading signal groups, $(LH_1^1 \ldots LH_1^n) \ldots (LH_n^1 \ldots LH_n^n)$, are applied to a leg heading group selector 145, each group representing one of $n$ different routes in accordance with the subscripts thereon. The appropriate group of leg heading signals for each simulated flight is chosen by route selection signals $R_1 \ldots R_n$. When route selection signal $R_1$ is on, leg heading signal group $LH_1^1 \ldots LH_1^n$ is chosen in selector 145 for application to selector 140, and so on.

Route selection signals $R_1 \ldots R_n$ are also employed in route selection matrix 165, which is used in translating signal DG into space coordinates X and Y representing the instantaneous position of the simulated aircraft on its simulated flight. This translation, broadly described, is accomplished by preprogramming, for each of the $n$ routes, the X and Y equivalents of each distance-to-go value for the route. In this embodiment of the invention, the equivalency is established by setting constants in a multiple function generator 160 such that each level of signal DG is translated into corresponding values of X and Y for the route selected. The function corresponding to the selected route is chosen by signals $R_1 \ldots R_n$ from route selection matrix 165. It should be noted here that in some embodiments of the invention route selection matrix 165 may be unnecessary, or may be combined with route coordinate function generator 160, depending on the type of function generator employed. Thus, the existence of a separate route selection matrix is not essential to the invention if the function generator 160 is responsive to route signals in itself. The X and Y output signals of function generator 160 represent the instantaneous position of the simulated aircraft during the simulated flight. As shown in FIG. 2, the X and Y signals may be employed to display the scheduled position of the real aircraft, or to generate an error signal ETF by comparison with coordinates $Xt$ and $Yt$, which represent the real aircraft's actual position. Up to this point, it may be noted, the arrangement of FIG. 2A may be considered to be in a static state, since the various circuits described receive the signals indicated even though no operation is being performed. The actual computing begins in response to a start signal which is applied to an interval timer 155. Timer 155 controls a switch 160 which then applies true ground speed signal TGS to integrator 110. Integrator 110 is initially set to represent a predetermined starting point for the simulated flight, which typically may be zero volts corresponding to a touchdown point in the case where the flight is to be simulated in reverse. The signals which are developed at the beginning of the computing operation then correspond to a zero or reference altitude and a zero distance-to-go position for the selected aircraft. The initial value of signal TGS then is the landing speed for the aircraft and controls the initial rate of increase of the signal DG produced by integrator 110.

As signal DG increases in amplitude, the various selection circuits just described are operative to change the values of their respective output so that signal TGS increases according to the flight profile, wind conditions, and route of the selected aircraft so that the amplitude of signal TGS represents the true ground speed of the aircraft according to its scheduled flight.

Signal DG is applied through a route selection matrix 165, responsive to signals $R_1 \ldots R_n$, to a route coordinate function generator 160. Each input lead connected to generator 160 is connected internally to a circuit which translates the input signal into output signals X and Y. Effectively, this is accomplished through the means of an analogue memory, in the specific embodiment of the invention illustrated in FIGS. 3 through 8. That is, each of the circuits in generator 160 is arranged to translate input signal DG into output signals X and Y according to the route of the respective aircraft. In other words, the translation in amplitude from the level of signal DG to that of output signals X and Y is a function of a stored analogue translation value. It will be understood, of course, that the same basic function may be accomplished by means of a digital memory which is operated by a digital input signal DG to read out a digital representation of the proper values of X and Y at that point of time.

Signals X and Y are then applied to gates 510 and 520, respectively, shown in FIGS. 2 and 2B. These gates also receive signal STF produced by comparator 400, as discussed above. Signal STF is then utilized to control the selection of amplitude to produce output pulses X and Y through gates 510 and 520 to represent the proper scheduled position in simulated flight.

A suitable arrangement of components for producing schedule error signal ETF is also indicated in FIG. 2B. As in the general arrangement of FIG. 2, a real time counter 300 is shown as receiving a signal representing the scheduled time for the aircraft to arrive for landing. It will be understood, of course, that a similar arrangement may be employed to represent the scheduled time of arrival of an aircraft at any desired point along its flight path. That is, the input signal to circuit 300 need not necessarily represent a landing point, but may represent any desired point along the flight path of the aircraft. The output of counter 300 represents the real time remaining for the aircraft to reach the chosen point on its flight path. The real time interval signal produced by circuit 300 is applied to comparator 400, which also receives the output count signals of a fast time countdown circuit 200, described in connection with FIG. 2, and produces signal STF to represent the schedule time remaining for the flight of the selected aircraft measured in terms of the number of simulated fast-time pulses which occur after the start signal. Signal STF produced by comparator 400 is supplied to difference detector circuit 630, which also receives input signal ATF representing the actual time of flight remaining. The manner in which ATF may be produced in a suitable manner will be discussed in further detail with reference to FIG. 2C below.

Signals STF and ATF are applied to a polarity flip-flop 631 which assumes a state depending upon which signal is received first. Arrangement is made in flip-flop 630 to inhibit the application of a second pulse after it has been set to a representative state. The output signal of flip-flop 631 is then employed to control an error in time to fly counter 632, which produces output signal ETF. Counter 632 receives fast-time counting pulses produced by generator 250 through an "and" circuit 633, which is controlled by a flip-flop 634. Flip-flop 634 receives an input signal which turns it on through an exclusive "or" circuit 635 receiving signals STF and ATF.

Thus, the error in time to fly counting is initiated in response to the signal passed through "or" circuit 635 as soon as either signal STF or ATF is received, and terminated by signal ATF or STF. The direction of the counting is controlled by the polarity signal of flip-flop 631, so that ETF represents the algebraic time difference, in fast time, between the occurrence of ATF and STF. If it is assumed that error signal ETF is defined as: $ETF = STF - ATF$, then polarity flip-flop 631 is set to a countdown-controlling state so that signal ETF is produced as a negative output signal or a lag signal. That is, the occurrence of a schedule time to fly signal STF before the occurrence of actual time to fly signal ATF means that the aircraft is behind schedule by the number of minutes, in real time, corresponding to the ETF count in fast time. In a similar manner the occurrence of signal ATF before signal STF is effective to turn flip-flop 631 to a state controlling the countup operation of counter 632 to produce a positive output signal but ETF to indicate a lead in the aircraft time schedule.

Referring now to FIG. 2C, a suitable arrangement for coordinate coincidence detector 620 of FIG. 1, which produces signal ATF, will now be described. It will be noted that signals X and Y from computer 100 and signals $Xt$ and $Yt$ from a tracking circuit are applied to a difference signal generating circuit 621. Generator 621 produces output signals $X-Xt$ on one output lead and $Y-Yt$ on a second output lead. Signal $X-Xt$ is applied to switches 622 and 623 and difference signal $Y-Yt$ is applied to switches 624 and 625.

These switches are controlled by means of a coincidence switch selector 630 producing output signals S2–5 and S3–4. When signal S2–5 is present switches 622 and 625 are caused to operate to apply difference signal $X-Xt$ to sharp coincidence circuit 626 and signal $Y-Yt$ to broad enabling circuit 627. When switching signal S3–4 is present, difference signals $X-Xt$ and $Y-Yt$ are applied through switches 623 and 624, respectively, to broad enabling circuit 627 and sharp coincidence circuit 626, respectively. In this manner coincidence selector circuit 620 determines which of the difference signals establishes a broad enabling and which is employed to develop the sharp coincidence pulse which constitutes output signal ATF. The reason for switching the X and Y comparisons between a broad or sharp comparison is that the aircraft will not be exactly on its flight path, so there will never be exact coincidence between signals $Xt-Yt$, which represent actual aircraft position, and signals X and Y, which represent simulated aircraft positions during simulated flight. However, if the aircraft is flying on a route parallel with the X axis there will be exact coincidence between X and $Xt$ and approximate coincidence between Y and $Yt$, since the aircraft will be somewhere in relatively narrow band around its scheduled route. Conversely, if the aircraft is flying on a route parallel with the Y axis there will be exact coincidence between Y and $Yt$ and approximate coincidence between X and $Xt$. Therefore, by detecting approximate coincidence along one axis and exact coincidence along the other a useable coincidence signal can be generated even though the aircraft's actual position is rarely exactly on the scheduled flight path. The switching of the sharp and broad coincidence circuits is controlled by signals S2–5 and S3–4, which are responsive to R and LO signals indicating the aircraft's route and leg occupancy. When circuits 626 and 627 both indicate coincidence an ATF signal is generated through "and" gate 628. The ATF signal, as described previously, thus represents approximate coincidence between the aircraft's actual position along the real path and the simulated position along the simulated flight path.

In FIG. 3 is shown a suitable arrangement for leg occupancy detector 150 and leg heading selector 140, disclosed in FIG. 2A. As described previously, detector 150 and selector 140 interact with group selector 145 (FIG. 2A) to select a single leg heading signal LH representing the heading of the leg occupied by the simulated aircraft during simulated flight. Group selector 145 may be any suitable switching circuit for selecting one group of predetermined leg heading signals from a plurality of such groups, in response to route signals $R_1 \ldots R_n$. Circuits of this type are well known to those skilled in the art. The output of group selector 145 represents the headings of the individual legs of the selected route, and the function of selector 140 and detector 150 is to select, during the course of the simulated flight, the leg occupied and to route the leg heading signal of the occupied leg through selector 140 to resolved wind computer 120.

Referring to FIG. 3, selector 140 receives signals $LH^1 \ldots LH^n$ at a plurality of input gates 140–1 ... 140–N, each comprising an input resistance 3R13, bias resistor 3R14, diodes D7, D8, and D9, output potentiometer 3R15 and output diode D11 ... D1N. The gating action occurs as follows: a leg occupancy signal which is low when the corresponding leg is not occupied and high when occupied, is applied to the cathode of D9, and a positive bias potential is applied through 3R14 to the anode of D9. Thus D9 conducts when the corresponding leg is not occupied, and cuts off when the corresponding leg is occupied. When D9 conducts D7 is cut off, since the leg heading signal input at the cathode thereof is positive. Signal LH1 is thus blocked when signal LO1 is low.

When leg 1 is occupied signal LO1 rises, back biasing diode D9 and consequently forward biasing diode D7 with the positive bias potential applied through 3R14. Signal LH1 then passes through diodes D7, D8, and D11 to the LH signal output lead. Potentiometer 3R15 provides a calibration adjustment to compensate for variations in the diode characteristics. Signal LO1 remains high while leg 1 is occupied and returns to the low state when the next succeeding leg is occupied. Thus gates 140–1 ... 140–N are opened and closed, one at a time, in a time sequence determined by the level of leg occupancy signals $LO^1 \ldots LO^n$.

Leg occupancy signals $LO^1 \ldots LO^n$ are generated by a plurality of signal generators 150–1 ... 150–N, one generator associated with each of the N routes handled by the invention. Each of the generators 150–1 ... 150–N contains a number of sub-generators corresponding to the individual legs of the corresponding route, the leg number being designated by the last digit of the sub-generator number. Thus, the sub-generator number 150–11 corresponds to leg 1 of route 1, sub-generator number 150–N2 corresponds to leg 2 of route N. The group of all sub-generators 150–11 ... 150–1N constitutes generator 150–1, and so on.

Each of the generators 150–1 ... 150–N has an input gating circuit controlled by a corresponding route selection signal, which operates to enable the generator associated with the selected route and disable all others. The input gating circuits, which are the same as the leg heading gating circuits described above, comprise diodes D1, D2, D3, and resistor 3R2. When signal $R_1$ is off, diode D3 conducts and back biases diodes D1 and D2, thus removing input signal $DG_A$ from generator 150–1. When signal $R_1$ is on, diode D3 is back biased and diodes D1 and D2 open to pass signal DG, to generator 150–1, which then acts to produce leg occupancy signals in accordance with the amplitude of signal DG. It will be understood that each route will generally have a different relation between leg occupancy and distance-to-go DG, and that this relation is pre-programmed into the generator corresponding to the route.

When signal DG is passed through the input gate of generator 150–1 it is applied to each sub-generator and to inverting amplifier $A_1$, whose output is also applied to each sub-generator. The sub-generators comprise diodes D4, D5, and D6, connected as shown in FIG. 3, along with their associated bias networks as therein shown. Each sub-generator is responsive to produce a positive gate whenever DG is in a predetermined voltage amplitude increment. The gate is produced whenever diode D5 conducts, and the amplitude of the gate is determined by the voltage drop across diode D5 and resistor 3R11. Diode D5 conducts whenever diodes D4 and D6 are both back biased, and cuts off whenever either diode D4 or diode D6 conducts. To produce the desired gate, D6 is normally forward-biased and D4 normally back biased by their respective bias networks. As DG increases, a potential is reached which back biases D6 and consequently forward biases D5. The gate thus begins at the voltage level of DG which overcomes the forward bias on D6, and lasts as long as diodes D6 and D4 are both back biased. As DG rises further —DG, of course, falls until a potential level is reached which overcomes the back bias on D4 and consequently back biases D5, thus ending the gate.

The action described above is illustrated in the wave forms shown in FIG. 3A, where line A represents the bias potential for both D4 and D6. When the +DG curve exceeds the forward bias on D6, the gate begins. When the —DG curve falls below the back bias on D4 the gate ends. It will be understood, of course, that the level of DG which is set to end the gate in LO1 must also initiate the gate for LO2, since the simulated aircraft must at all times be in some leg of the simulated route. The starting and ending potentials of each sub-generator are set by two common bias networks, 3R3 ... 3R6 and 3R7 ... 3R10, such that one and only one gate is high for each amplitude level of DG. By appropriate selection of bias levels, each gate is set to remain high for the amplitude range of DG corresponding to occupancy of the respective route leg during the simulated flight.

The $LO^1$ output leads of each generator 150–1 ... 150–N are connected to the $LH^1$ gate, described previously, to open the $LH^1$ gate whenever leg 1 of any of the N routes is occupied. The other LO output leads are similarly connected to their corresponding LH gates for the same reason.

In summary, the leg heading signal LH is produced by choosing from a plurality of leg heading groups a group of leg heading signals $LH^1 \ldots LH^n$ representing the selected route, choosing from a plurality of leg occupancy generators a generator representing the selected route, then gating signals $LH^1 \ldots LH^n$ onto the LH conductor one at a time in a time sequence set by the distance-to-go signal.

In FIG. 4 is shown a suitable arrangement for wind data selector 135, disclosed in FIG. 2A. Wind amplitude signals $WA_0 \ldots WA_m$ and wind magnitude signals $WM_0 \ldots WM_m$ are applied to a plurality of corresponding gates 135–$A_0$ ... 135–$A_m$ and 135–$M_0$ ... 135–$M_n$. The wind signals represent the measured direction and magnitude of the wind in M different altitude intervals along the selected route. The gates are opened, one at a time, by altitude signals $A_0 \ldots A_m$, which indicate the altitude interval occupied at any point in the simulated flight. The operation of these gates is similar to that of the leg heading gates, described in connection with FIG. 3. The output of wind data selector 135 is a wind magnitude signal and a wind angle signal, which are both applied to computer 120 to produce the TGS signal.

FIG. 5 shows a suitable arrangement for leg heading group selector 145 disclosed in FIG. 2A. A series of leg heading signals $LH_1^1 \ldots LH_n^n$ are applied to a series of corresponding gates 145–11 ... 145–NN. The subscript denotes the route number of the signal, and the super-script the leg number. Each gate corresponding to route 1 is controlled by route selection signal R1 to open when R1 is on and close when R1 is off. The other gates are controlled by their corresponding route selection signals in the same manner. The operation of each individual gate is similar to that of the leg heading gates, previously described in connection with FIG. 3. The output of leg heading group selector 145 is a single group of leg heading signals LH1 ... LHN representing the leg headings of the selected route.

FIG. 6 shows a suitable arrangement for altitude intervalizer 130, disclosed in FIG. 2A, which produces altitude increment signals $A_0 \ldots A_m$ for wind data selector 135, previously described. Altitude intervalizer 130 contains a plurality of gate generators 130–0 ... 130–M which are similar to the leg occupancy sub-generators described in connection with FIG. 3. Generators 130–0 ... 130–M contain diodes D51, D52, and D53, along with their respective bias resistors, as shown. A positive gate is generated across 6R53 whenever D51 and D52 are both back biased at the same time. When either diode D51 or diode D52 is forward biased the cathode potential thereof is low, and no output gate is produced. With no signal input, diode D51 is forward biased and diode D52 is back biased. A positive-going altitude signal ALT is applied to the cathode of D51 and to an inverting amplifier A130, whose output is coupled to the cathode of D52. The output gate begins when signal +ALT overcomes the forward bias of diode D51, and terminates when the output of amplifier A130 overcomes the back-bias on diode D52, in the manner previously described for the leg occupancy generators shown in FIG. 3. The bias levels in the altitude interval generators are set such that one and only one altitude gate is high for each level of input signal ALT, in accordance with predetermined increments of altitude. The output of the altitude generators 130–0 . . . 130–M is coupled through cathode followers $K_0$ . . . $K_m$ to wind data selector 135.

FIGS. 7 and 8 show suitable arrangements for true airspeed generator 105, altitude signal generator 125, route matrix 165, and route coordinate generator 160, all disclosed in FIG. 2A. These circuits are based on a common function generating circuit disclosed in copending application Serial No. 807,608, filed April 20, 1959, by Wendell B. Sander for Function Generator Circuits, now Patent No. 2,976,430. This circuit can be best explained in connection with FIG. 8, which shows route matrix 165 and route coordinate generator 160. Route matrix 165 comprises a plurality of gates 165–10 . . . 165–1N each associated with a corresponding function generator circuit. The gates comprise two diodes D61 and D62, each connected to a common bias potential through resistors RS. Route signals $R_1$ . . . $R_n$ are applied to the cathodes of corresponding diodes D62, and when the route signal is low diode D62 conducts and grounds the output of the corresponding function generator amplifier. When the route signal is high, diode D62 is back biased and the amplifier output is passed through diode D61 to produce coordinate signals X and Y for the selected route.

The individual function generators comprise an operational amplifier A160, an output intervalizer having sections 160–L1 . . . 160–LK, a coordinate generator having sections 160–T1 . . . 160–TK, a coordinate summing circuit comprising resistors RX1 . . . RXK and RY1 . . . RYK, and output amplifiers AX and AY. Broadly described, the operation of the function generator is as follows: The input signal, —DG, is segmentized into amplitude intervals corresponding to legs of the selected route by the output intervalizer, and the translation between DG and the X and Y coordinates for the corresponding leg is made in the corresponding section of the coordinate generator. Each section of the output intervalizer is operable only during its predetermined amplitude segment, as best illustrated in FIG. 8A, which shows waveforms for the output voltage of five sections of the output intervalizer. When DG is in interval AB, section L1 is open to follow DG, and the other sections are off. When DG enters interval BC, section L1 reaches an upper limiting voltage, which remains constant as long as signal DG exceeds level B, and section L2 opens to follow DG. Section L2 reaches a limiting voltage at level C, whereupon section L3 opens, and so on. The sum of the output levels of all sections equals the value of DG at all times, but only one section is free to follow amplitude variations therein for each amplitude interval.

Since the relation between DG and X, Y is constant in each leg of the route, the translation from DG to X, Y can be made in potentiometers set in accordance with the slope of the leg with respect to X and Y. This slope will, of course, be different for each leg of the route, and therefore the translation is made at the output of each individual section of the intervalizer. The X and Y outputs of each individual section are then summed in resistors RX1 . . . RXK and RY1 . . . RYK to give the X and Y coordinates of the aircraft as it progresses from leg to leg during the simulated flight.

The individual sections of the output intervalizer contain two diodes D71 and D72 as shown, which are biased to be both conducting in the desired amplitude interval. D71 is biased to cut off when signal DG is below the desired amplitude interval, and D72 is biased to cut-off when DG is above the desired amplitude interval. The starting and ending points of each amplitude interval are set to correspond to the starting and ending points of route legs, as determined by the relation between the amplitude of signal DG and actual distance-to-go. And, as noted above, the coordinate generator section associated with each interval is set according to the slope of the corresponding leg with respect to X and Y.

True airspeed signal generator 105, shown in FIG. 7, also employs a plurality of function generators 105–1 . . . 105–P, each corresponding to a different aircraft profile. The generators are selected by a plurality of profile signals $P_1$ . . . $P_p$, which actuate the generator corresponding to the selected profile and disable all others. Selection is made through gates similar to the leg heading gates previously described in connection with FIG. 3. The true airspeed generators are modifications of the Sander function generator circuit, described above, with the intervalizing sections thereof disposed horizontally in the drawing of FIG. 7. Each generator contains an output intervalizer comprising sections 105–11 . . . 105–N1, an output translator comprising sections RO1 . . . RON, and an output summing network comprising resistors RS1 . . . RSN. The individual sections of the output intervalizer are biased to operate during amplitude intervals corresponding to increments of TAS in the selected profile, and the output translator associated with each section is set in accordance with the TAS of the corresponding increment of the profile. That is, the interval starting and ending points are points on the profile where the rate of change in TAS changes, and the output translator resistors are set to represent the rate of change in TAS with respect to DG for the given interval. Except for this modification, the operation of the function generator is the same as described above in connection with FIG. 8 and FIG. 8A.

Altitude signal generator 125 is similar to true air speed generator 105, having a plurality of Sander function generators 125–1 . . . 125–P, which are controlled by profile signals $P_1$ . . . $P_p$ through gates as described above in connection with generator 105. Each altitude signal generator has a plurality of output intervalizing sections 125–11 . . . 125–N1, a plurality of output translator sections RO1 . . . RON, and an output summing network RS1 . . . RSN. The amplitude intervals of sections 125–11 . . . 125–N1 are set to correspond to different rates of change in altitude for the corresponding profile, and the output translators RO1 are set to the rate of change in altitude with respect to DG for the corresponding interval.

From the foregoing description it will be apparent that this invention provides a system operable to produce signals representing the scheduled position for an aircraft taking into consideration the aircraft's profile, route, and the effect of wind along the aircraft's route. It will also be apparent that this invention provides a device for accurately simulating flight of an aircraft along a predetermined route, and provides improved circuits for generating signals representing true air speed, wind magnitude, and angle, altitude and true ground speed—generated to correspond to various points on a predetermined flight path—and improved circuits for generating signals representing scheduled distance remaining to a fixed point on the flight path, and signals representing schedule error.

It should be understood that this invention is not limited to the specific circuits disclosed herein, since many modifications can be made therein without departing from the basic teaching of this invention. For example, instead of generating leg occupancy gates in detector 150, as shown in FIG. 2A, they could be generated by a shifting register responsive to route coordinate function generator 160, which switches from section-to-section according to leg occupancy. Therefore, instead of deriving leg occupancy gates from signal DG in detector 150, they could be derived by feeding switching pulses from generator 160 to a shifting register type of gate generator. In addition, route selection matrix 165 can be combined with route coordinate generator 160 in some modifications, and the schedule error signal ETF may be derived as a distance lead or lag rather than a time lead or lag as shown. And many different function generator circuits might be utilized for true air speed signal generator 105, altitude signal generator 125, and route coordinate signal generator 160, as will be well understood by those skilled in the art. The broad concept of producing schedule signals by simulated flight in fast time can be embodied in many forms, and this invention includes all modifications falling within the scope of the following claims.

We claim:

1. In a system for controlling an aircraft to adhere to a scheduled flight along a predetermined route, the aircraft having a predetermined profile specifying variations in air speed and altitude along the predetermined route, said system including means for generating a position signal continuously representing the position of the aircraft, the combination comprising: first means responsive to an applied start signal for producing a flight signal in simulated flight time representing the movement of the aircraft along its route according to its profile, with compensation being made to adjust for the effect of wind along the aircraft route, said first means including circuits for controlling the rate of change in amplitude of said flight signal in accordance with the air speed of the aircraft specified by its profile and in accordance with the influence of wind along the route of the aircraft; a second means, operable in synchronism with said first means, for producing a signal indicating the occurrence, after said start signal, of a simulated flight time corresponding to the scheduled time remaining for the aircraft to arrive at a predetermined point on its route; third means coupling said first and second means and responsive to the signals produced thereby for translating the signal of said first means into an output signal indicating the proper position for said aircraft according to its schedule; and fourth means coupled to said first and second means and responsive to the signals produced thereby and to said position signal for producing a timing signal indicating the approximate coincidence in position represented by said position signal with that represented by a said flight signal, the time between said timing signal and said start signal corresponding, in simulated time, to the actual time remaining to fly for said aircraft along its route; said fourth means further including means for producing an output signal representing the difference between the actual time remaining for flight and the scheduled time remaining for flight for said aircraft.

2. In an air traffic control system for controlling the flight of a plurality of aircraft scheduled to arrive at a common point at different respective times, said system including means for representing the landing time for each aircraft as a landing sequence signal, including means for introducing signals representing the present position of the aircraft during its flight along a predetermined route according to a predetermined flight profile specifying the altitude variations of the aircraft during its flight and the speed of the aircraft as it progresses along its flight, and including means for producing signals representing the wind velocity and direction at various altitudes, the combination comprising: first means for translating signals representing the profile, wind, and route for the aircraft into a time-varying signal representing the distance of travel for the aircraft from a predetermined starting point, said first means including a control circuit for varying the rate of change of said time-varying signal according to the true ground speed of the aircraft, said control circuit being responsive to said signals representing the profile and route of the aircraft and the wind along the aircraft route to develop a signal representing the true ground speed of said aircraft along its route; second means responsive to said landing sequence signal and to a signal representing the present time, for generating a schedule signal indicating the scheduled time remaining for flight for the aircraft; and third means responsive to said schedule signal and to said time-varying signal for producing output signals representing the position with the respective aircraft should occupy according to their respective schedules.

3. A system for producing an output signal representing the scheduled position for an aircraft in response to applied input signals representing: the altitude and true air speed specified for the aircraft along its flight path; and the wind vector and angle at various altitudes; said system further receiving signals representing the scheduled time for arrival of the aircraft at a predetermined point on its flight path and a start signal, said system comprising: first means responsive to said input signals and said start signal for producing a flight signal on a simulated reduced time basis with a rate of amplitude variation controlled as a function of the true ground speed of the aircraft, said true ground speed being represented in said first means by circuits responsive to signals representing the flight path for the aircraft; second means responsive to said flight signal for producing resolved coordinate signals X and Y continuously varying in time to represent the scheduled position of the aircraft in simulated flight; and third means for translating the input signal representing the scheduled time for arrival of the aircraft into a control signal for selecting amplitudes of signals X and Y representing the present scheduled position for said aircraft.

4. In combination: first means for producing a fast-time simulated flight signal representing the scheduled flight of an aircraft along a predetermined route with a predetermined speed and altitude variation; second means for translating the fast-time flight signal into first output signals representing the present scheduled coordinate position for the aircraft; and third means responsive to said fast-time flight signal and to input signals representing the actual position of the aircraft for producing a second output signal indicating the schedule error for said aircraft.

5. A system for providing flight information for an aircraft, said system receiving first input signals designating a predetermined flight path for the aircraft, second input signals indicating prescribed rates of speed for the aircraft along its flight path, third input signals representing a scheduled time for arrival of the aircraft at a particular point on its flight path, and fourth input signals representing present time, said system comprising: a fast-time flight computer for producing first output signals X and Y continuously representing the proper coordinate position for the aircraft throughout a simulated flight in fast time; second means for comparing said third and fourth input signals to produce a second output signal representing the condition whereby the scheduled time remaining for simulated flight corresponds to the elapsed time of simulated fast-time flight; and third means responsive to said first and second output signals for providing a display representing the scheduled position of the aircraft at the present time.

6. A system for producing control signals for guiding an aircraft, comprising: first means for producing output signals X and Y representing the proper position for the aircraft according to a predetermined flight schedule, said first means being operable in response to first input signals representing the profile and route of the aircraft and second signals representing the wind velocity and direction at various altitudes along the flight path of the aircraft; second means responsive to a third input signal representing the landing sequence time for the aircraft and responsive to a fourth input signal representing absolute time, for producing an output signal STF representing the scheduled flight time remaining for the aircraft along its predetermined flight path; third means responsive to signal STF and signals X and Y for providing a display representing the scheduled instantaneous position of the aircraft at any desired time; and fourth means responsive to sixth input signals X$t$ and Y$t$, representing the actual position of the aircraft, and to signals X and Y for producing a signal ATF representing the actual time of flight remaining and for producing an output signal ETF representing the difference between signals STF and ATF.

7. A device for generating time-varying output signals representing the scheduled flight of an aircraft in simulated fast time, comprising: first means for generating a distance-to-go signal with an amplitude variation with respect to time controlled in accordance with an applied rate-control signal representing the true ground speed of the aircraft in simulated fast time; second means, responsive to said distance-to-go signal and to first input signals representing the wind magnitude and direction at various altitudes along the flight path of the aircraft and to second input signals indicating the angular direction of various legs of the scheduled aircraft flight, for producing a resolved wind signal varying in simulated fast time to indicate the magnitude of the wind along various corresponding segments of the simulated flight path for the aircraft; third means responsive to said distance-to-go signal and to third input signals indicating the scheduled true air speed for the aircraft along its simulated flight path, for producing an output signal in simulated fast time indicating the scheduled true air speed for the aircraft at each point of its simulated flight path; fourth means coupled to said second and third means and responsive to the signals produced thereby for producing said rate-control signal corresponding to the true ground speed of the aircraft; and fifth means coupled to said first means for translating said distance-to-go signal into said output signals representing the scheduled flight of the aircraft in simulated fast time.

8. In combination: an integrator responsive to a first input signal for producing an output signal DG representing the distance between two points on the flight path of an aircraft as a function of simulated fast time; means for producing said first input signal in response to signal DG and to second and third input signals representing the scheduled true air speed of the aircraft and the velocity of wind resolved along various segments of the aircraft flight path, said first input signal being produced to have an amplitude corresponding to the true ground speed of the aircraft along its flight path and being produced to vary at a rate corresponding to said simulated fast time; and output means, responsive to signal DG, for producing signals X and Y representing the scheduled coordinate position for the aircraft for each point of simulated time.

9. A system for producing output signals representing the scheduled position of a selected one of a plurality of aircraft, each of said plurality of aircraft being given a respective flight path defined as a route comprising a plurality of legs with predetermined headings and a profile specifying the variation in true air speed and altitude for the aircraft along its flight path as a function of the distance to go between two points thereon, said system comprising: first means for producing a simulated flight signal DG representing said distance to go and having an amplitude variation in fast, simulated time controllable as a function of a first input signal TGS representing the true ground speed of the selected aircraft; second means, responsive to signal DG and to a selection signal indicating which of said aircraft is selected for generating a signal TAS representing the true air speed of the selected aircraft for each corresponding distance to go represented by signal DG; third means, responsive to signals representing the wind velocity resolved along the flight path of the selected aircraft, and to input signals corresponding to the respective headings of the legs of the route of the selected aircraft, for producing said signal TGS so that each amplitude portion thereof corresponds in said fast, simulated time to the true ground speed of the selected aircraft at that point on its simulated flight path, as indicated by signal DG; and fourth means for translating signal DG into said output signals.

References Cited in the file of this patent

UNITED STATES PATENTS

| | | |
|---|---|---|
| 2,475,221 | Coley | July 5, 1949 |
| 2,717,120 | Bellamy | Sept. 6, 1955 |
| 2,766,953 | Cummings | Oct. 16, 1956 |
| 2,787,428 | Schuck | Apr. 2, 1957 |
| 2,844,817 | Green | July 22, 1958 |
| 2,916,202 | Beishline | Dec. 8, 1959 |